United States Patent [19]

Marmon et al.

[11] Patent Number: 6,066,221
[45] Date of Patent: *May 23, 2000

[54] METHOD OF USING ZONED HOT AIR KNIFE

[75] Inventors: Samuel Edward Marmon, Alpharetta; Christopher Cosgrove Creagan, Marietta; Stephen H. Primm, Cumming, all of Ga.; Thomas Gregory Triebes, Tucson, Ariz.

[73] Assignee: Kimberly-Clark Worldwide, Inc., Neenah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,377

[22] Filed: Jun. 17, 1997

[51] Int. Cl.[7] .......................... B29C 65/10; B32B 31/26; D04H 1/48; D04H 1/54
[52] U.S. Cl. ........................ 156/148; 156/181; 156/290; 156/324; 156/497
[58] Field of Search .............................. 156/82, 148, 181, 156/290, 324, 497, 291, 88, 167; 428/198; 442/409

[56] References Cited

U.S. PATENT DOCUMENTS

| | | |
|---|---|---|
| 3,093,502 | 6/1963 | Drelich ................................... 428/198 |
| 3,230,584 | 1/1966 | Kalwaites . |
| 3,256,581 | 6/1966 | Thal et al. . |
| 3,322,584 | 5/1967 | Welin-Berger ............................ 156/88 |
| 3,338,992 | 8/1967 | Kinney . |
| 3,341,394 | 9/1967 | Kinney . |
| 3,423,266 | 1/1969 | Davies et al. . |
| 3,502,538 | 3/1970 | Petersen . |
| 3,502,763 | 3/1970 | Hartmann . |
| 3,542,615 | 11/1970 | Dobo et al. . |
| 3,617,417 | 11/1971 | Olson ................................... 156/181 |
| 3,635,625 | 1/1972 | Voss . |
| 3,640,163 | 2/1972 | Giardini et al. . |
| 3,692,618 | 9/1972 | Dorschner et al. . |
| 3,802,817 | 4/1974 | Matsuki et al. . |
| 3,849,241 | 11/1974 | Butin et al. . |
| 3,975,224 | 8/1976 | Ruzek et al. . |

(List continued on next page.)

FOREIGN PATENT DOCUMENTS

| | | |
|---|---|---|
| 0316195 | 5/1989 | European Pat. Off. . |
| 0400581 | 12/1990 | European Pat. Off. . |
| 0586924 | 3/1994 | European Pat. Off. . |
| 1660795 | 8/1972 | Germany . |
| 61-239074 | 10/1986 | Japan . |
| 6463110 | 3/1989 | Japan . |
| 05239754 | 12/1993 | Japan . |
| 6182891 | 7/1994 | Japan . |
| 6158499 | 9/1994 | Japan . |
| 1239911 | 7/1971 | United Kingdom ................... 156/290 |

OTHER PUBLICATIONS

Kirk–Othmer, *Encyclopedia of Chemical Technology*, vol. 16, pp. 86–92, 1981.

*Polymer Blends and Composites*, Manson, John A. And Sperling, Leslie H.; Plenum Press, New York, Copyright 1976; ISBN 0–306–30831–2, pp. 273–277.

*Primary Examiner*—Steven D. Maki
*Attorney, Agent, or Firm*—Pauley Petersen Kinne & Fejer

[57] ABSTRACT

A zoned hot air knife assembly and process include a plurality of discrete, spaced apart air knives is useful for the inter-filament bonding of nonwoven webs, for the thermal bonding of laminates including nonwoven webs, and other applications. The zoned hot air knife assembly and process facilitate the manufacture of low bond area, low density nonwoven webs and laminates having high structural integrity. The zoned hot air knife also reduces the amount of heated air and, thus, energy required for the production of thermally bonded nonwoven webs and laminates.

26 Claims, 2 Drawing Sheets

U.S. PATENT DOCUMENTS

| | | |
|---|---|---|
| 3,996,825 | 12/1976 | Terry . |
| 4,007,652 | 2/1977 | Shinomiya et al. . |
| 4,011,124 | 3/1977 | Baxter . |
| 4,041,203 | 8/1977 | Brock et al. . |
| 4,048,885 | 9/1977 | Miyakita et al. . |
| 4,070,222 | 1/1978 | Olson ................ 156/497 |
| 4,083,913 | 4/1978 | Marshall . |
| 4,154,648 | 5/1979 | Osterberg et al. . |
| 4,154,883 | 5/1979 | Elias ................ 156/290 |
| 4,265,954 | 5/1981 | Romanek ................ 156/290 |
| 4,323,760 | 4/1982 | Greenway et al. . |
| 4,340,563 | 7/1982 | Appel et al. . |
| 4,364,156 | 12/1982 | Greenway et al. . |
| 4,413,965 | 11/1983 | Kinoshita et al. . |
| 4,471,514 | 9/1984 | Stokes . |
| 4,567,796 | 2/1986 | Kloehn et al. . |
| 4,573,382 | 3/1986 | Kloehn et al. . |
| 4,578,141 | 3/1986 | Gidge et al. . |
| 4,883,707 | 11/1989 | Newkirk . |
| 5,041,255 | 8/1991 | Zafiroglu ................ 264/288.8 |
| 5,108,820 | 4/1992 | Kaneko et al. . |
| 5,108,827 | 4/1992 | Gessner . |
| 5,116,363 | 5/1992 | Romweber et al. . |
| 5,169,706 | 12/1992 | Collier, IV et al. . |
| 5,190,812 | 3/1993 | Joseph et al. . |
| 5,229,191 | 7/1993 | Austin ................ 156/167 |
| 5,234,172 | 8/1993 | Chupka et al. . |
| 5,256,224 | 10/1993 | Gillyns et al. . |
| 5,303,826 | 4/1994 | Buzga . |
| 5,336,552 | 8/1994 | Strack et al. . |
| 5,382,400 | 1/1995 | Pike et al. . |
| 5,399,174 | 3/1995 | Yeo et al. . |
| 5,405,684 | 4/1995 | Cockfield et al. . |
| 5,412,881 | 5/1995 | Romweber et al. . |
| 5,425,981 | 6/1995 | Brüning et al. . |
| 5,587,041 | 12/1996 | Sandusky et al. . |
| 5,707,468 | 1/1998 | Arnold et al. ................ 156/290 |

METHOD OF USING ZONED HOT AIR KNIFE

FIELD OF THE INVENTION

This invention is directed to a hot air knife assembly useful in the production of very low density spunbond fabrics, as well as spunbond/meltblown/spunbond nonwoven laminate structures, and bonded carded webs. More particularly, this invention is directed to a zoned hot air knife assembly having a plurality of spaced apart zones. The invention also includes a method of producing spunbond fabrics that are not significantly compacted or prebonded.

BACKGROUND OF THE INVENTION

Nonwoven fabrics or webs constitute all or part of numerous commercial products such as adult incontinence products, sanitary napkins, disposable diapers and hospital gowns. Nonwoven fabrics or webs have a physical structure of individual fibers, strands or threads which are interlaid, but not in a regular, identifiable manner as in a knitted or woven fabric. The fibers may be continuous or discontinuous, and are frequently produced from thermoplastic polymer or copolymer resins from the general classes of polyolefins, polyesters and polyamides, as well as numerous other polymers. Blends of polymers or conjugate multicomponent fibers may also be employed. Methods and apparatus for forming fibers and producing a nonwoven web from synthetic fibers are well known; common techniques include meltblowing, spunbonding and carding.

Nonwoven fabrics may be used individually or in composite materials as in a spunbond/meltblown (SM) laminate or a three-layered spunbond/meltblown/spunbond (SMS) fabric. They may also be used in conjunction with films and may be bonded, embossed, treated or colored. Colors may be achieved by the addition of an appropriate pigment to the polymeric resin. In addition to pigments, other additives may be utilized to impart specific properties to a fabric, such as in the addition of a fire retardant to impart flame resistance or the use of inorganic particulate matter to improve porosity. Because they are made from polymer resins such as polyolefins, nonwoven fabrics are usually extremely hydrophobic. In order to make these materials wettable, surfactants can be added internally or externally. Furthermore, additives such as wood pulp or fluff can be incorporated into the web to provide increased absorbency and decreased web density. Such additives are well known in the art. Bonding of nonwoven fabrics can be accomplished by a variety of methods typically based on heat and/or pressure, such as through air bonding and thermal point bonding. Ultrasonic bonding, hydroentangling and stitchbonding may also be used. There exist numerous bonding and embossing patterns that can be selected for texture, physical properties and appearance.

Qualities such as strength, softness, elasticity, absorbency, flexibility and breathability are readily controlled in making novwovens. However, certain properties must often be balanced against others. An example would be an attempt to lower costs by decreasing fabric basis weight while maintaining reasonable strength. Nonwoven fabrics can be made to feel cloth-like or plastic-like as desired. The average basis weight of nonwoven fabrics for most applications is generally between 5 grams per square meter and 300 grams per square meter, depending on the desired end use of the material.

Nonwoven fabrics have been used in the manufacture of personal care products such as disposable infant diapers, children's training pants, feminine pads and incontinence garments. Nonwoven fabrics are particularly useful in the realm of such disposable absorbent products because it is possible to produce them with desirable cloth-like aesthetics at a low cost. Nonwoven personal care products have had wide consumer acceptance. The elastic properties of some nonwoven fabrics have allowed them to be used in form-fitting garments, and their flexibility enables the wearer to move in a normal, unrestricted manner. This combination of properties has also been utilized in materials designed for treating injuries; an instance of such a commercialy available product is Kimberly-Clark's Flexus™ wrap. This wrap is effective in providing support for injuries without causing discomfort or complete constriction. The SM and SMS laminate materials combine the qualities of strength, vapor permeability and barrier properties; such fabrics have proven ideal in the area of protective apparel. Sterilization wrap and surgical gowns made from such laminates are widely used because they are medically effective, comfortable and their cloth-like appearance familiarizes patients to a potentially alienating environment.

Various mechanisms have been employed for increasing the integrity of nonwoven webs such as spunbonded filament webs. One known method is compaction, in which the web is passed between heated or unheated nip rollers to cause interfilament bonding. Another known mechanism is the hot air knife. A hot air knife is useful in bonding the individual polymer filaments together at various locations, so that the web has increased strength and structural integrity. Hot air knives are also used for aligning meltblown fibers during manufacture of meltblown webs, for cutting nonwoven fabrics, for chopping reclaim, and for a variety of other uses.

One use of the hot air knife is to improve the structural integrity of nonwoven webs before passing them through standard inter-filament bonding processes. Through-air bonding ("TAB") is a process of bonding a nonwoven bicomponent fiber web in which air sufficiently hot to melt one of the polymers in the fibers of the web is forced through the web. The air velocity is between 100 and 500 feet per minute and the dwell time may be as long as 6 seconds. The melting and resolidification of the polymer provides the bonding. TAB has relatively restricted variability and since TAB requires the melting of at least one component to accomplish bonding, it is most effective when applied to webs with two components like conjugate fibers or those which include an adhesive. In the through-air bonder, air having a temperature above the melting temperature of one component and below the melting temperature of another component is directed from a surrounding hood, through the web, and into a perforated roller supporting the web. Alternatively, the through-air bonder may be a flat arrangement wherein the air is directed vertically downward onto the web. The operating conditions of the two configurations are similar, the primary difference being the geometry of the web during bonding. The hot air melts the lower melting polymer component and thereby forms bonds between the filaments to integrate the web.

The TAB process requires the web to have some initial structural integrity, sufficient to hold the web together during TAB. The hot air knife has been used to provide nonwoven webs (e.g., spunbond webs) with initial structural integrity prior to TAB. However, a conventional hot air knife which exposes the entire web to pre-bonding may undesirably increase the density and reduce the thickness of the nonwoven web.

A conventional hot air knife includes a mandrel with a slot that blows a jet of hot air onto the nonwoven web surface.

U.S. Pat. No. 4,567,796, issued to Kloehn et al., discloses a hot air knife which follows a programmed path to cut out shapes needed for particular purposes, such as the leg holes in disposable diapers. U.S. application Ser. No. 08/362,328 to Arnold et al., filed Dec. 22, 1994, now U.S. Pat. No. 5,707,468 discloses using a hot air knife to increase the integrity of a spunbond web. FIG. 1 shows an exemplary hot air knife in cross-section. Hot air is supplied from a plenum 31 through a slot 2 onto a nonwoven web (not shown). Typically, the length of the slot 2 (i.e., in a direction perpendicular to the paper) will be at least as great as the width of the nonwoven web being treated.

Although hot air knives have proven useful in many areas, there are applications in which lighter weight, fluffier nonwoven materials would be desirable from standpoints of cost savings, aesthetic appearance, and/or performance. One way to lower the density of a spunbond web, for instance, is to decrease the amount of bonding between the individual filaments.

SUMMARY OF THE INVENTION

The present invention is directed to a hot air knife assembly and process for thermally increasing the integrity of a nonwoven polymer web. A nonwoven web is passed beneath a plurality of spaced apart hot air knife zones which permit the jetting of hot air at a multiplicity of discrete, spaced apart locations across the width of a nonwoven web. By breaking the hot air into a plurality of smaller, spaced apart jets, it becomes possible to apply hot air in a pattern that exposes a much lower percentage of the nonwoven web area to the hot air used for bonding, cutting, or other purposes. The invention enables the production of nonwoven spunbond webs having lower percentage bond areas and, consequently, lower bulk densities, than can be achieved using a conventional hot air knife traversing the width of the web.

Preferably, the spaced apart jet zones are movable laterally between the side edges of the nonwoven web, permitting the application of hot air in a weaving, sinusoidal or other nonlinear pattern as the web travels in a machine direction underneath the hot air knife.

Using the hot air knife of the invention, narrow discrete columns of heated air can be applied to an unbonded web, creating machine direction high integrity "tread lines". These high integrity tread lines eliminate the need for compaction of the web, or for hot air knifing 100% of the web, in order to achieve high integrity interfilament bonding.

With the foregoing in mind, it is a feature and advantage of the invention to provide a process for increasing the integrity of a nonwoven web which uses a hot air knife assembly having a plurality of spaced apart hot air knife zones.

It is also a feature and advantage of the invention to provide a process of pre-bonding a nonwoven web prior to through-air bonding, which process increases the integrity of the nonwoven web without significantly increasing its overall density or lowering its overall thickness.

It is also a feature and advantage of the invention to provide a method of applying hot air which achieves high integrity inter-filament bonding, yet lowers the overall bond area in a nonwoven web.

The foregoing and other features and advantages of the invention will become further apparent from the following detailed description of the presently preferred embodiments, read in conjunction with the accompanying drawings.

DEFINITIONS

Figure 1:
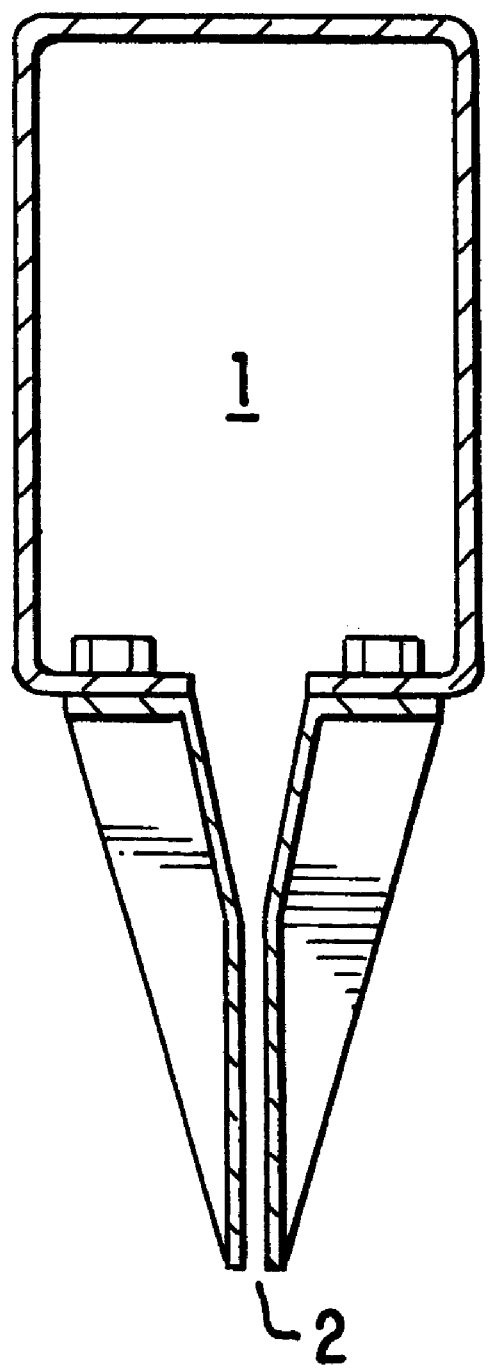
FIG. 1 is a cross-sectional view of a conventional hot air knife, as described above.

As used herein, the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The term also includes films that have been perforated or otherwise treated to allow air to pass through. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.) As used herein, the term "microfibers" means small diameter fibers having an average diameter not greater than about 75 microns, for example, having an average diameter of from about 0.5 micron to about 50 microns, or more particularly, microfibers may have an average diameter of from about 2 microns to about 40 microns.

As used herein, the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al. Spunbond fibers are quenched and generally not tacky when they are deposited onto a collecting surface. Spunbond fibers are generally continuous and have average diameters larger than 7 microns, often between about 10 and 20 microns.

As used herein, the term "spunbonded web" refers to a nonwoven mat comprised of spunbonded fibers.

As used herein, the term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally selfbonding when deposited onto a collecting surface.

As used herein, the term "meltblown fabric" refers to a nonwoven mat being comprised of meltblown fibers.

As used herein, the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

As used here, the term "machine direction" or MD means the length of a fabric in the direction in which it is produced. The term "cross machine direction" or CD means the width of fabric, i.e., a direction generally perpendicular to the MD.

As used herein, the term "bicomponent" refers to fibers which have been formed from at least two polymers extruded from separate extruders but spun together to form one fiber. Bicomponent fibers are also sometimes referred to as multicomponent or conjugate fibers. The polymers are usually different from each other though bicomponent fibers may be made from fibers of the same polymer. The polymers are arranged in substantially constantly positioned distinct zones across the cross-section of the bicomponent fibers and extend continuously along the length of the conjugate fibers. The configuration of such a bicomponent fiber may be, for example, a sheath/core arrangement wherein one polymer is surrounded by another or may be a side by side arrangement or an "islands-in-the-sea" arrangement. Bicomponent fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein, the term "biconstituent fibers" refers to fibers which have been formed from at least two polymers extruded from the same extruder as a blend. The term "blend" is defined below. Biconstitutent fibers do not have the various polymer components arranged in relatively constantly positioned distinct zones across the cross-sectional area of the fiber and the various polymers are usually not continuous along the entire length of the fiber, instead they usually form fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2 on pages 273 through 277.

As used herein, the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, the term "hot air knife" refers to a device through which a stream of heated air under pressure can be emitted and directed. With such a device, it is also possible to control the air flow of the resultant jet of heated air. A conventional hot air knife is described in coassigned U.S. application Ser. No. 08/362,328 filed Dec. 22, 1994 and U.S. Pat. No. 4,567,796 issued Feb. 4, 1986; both the application and the patent are hereby incorporated by reference in their entireties.

As used herein, the term "composite" or "composite material" refers to a material which is comprised of one or more layers of nonwoven fabric combined with one or more other fabric or film layers. The layers are usually selected for the different properties they will impart to the overall composite. The layers of such composite materials are usually secured together through the use of adhesives, entanglement or bonding with heat and/or pressure.

DETAILED DESCRIPTION OF THE PRESENTLY PREFERRED EMBODIMENTS

Figure 2:
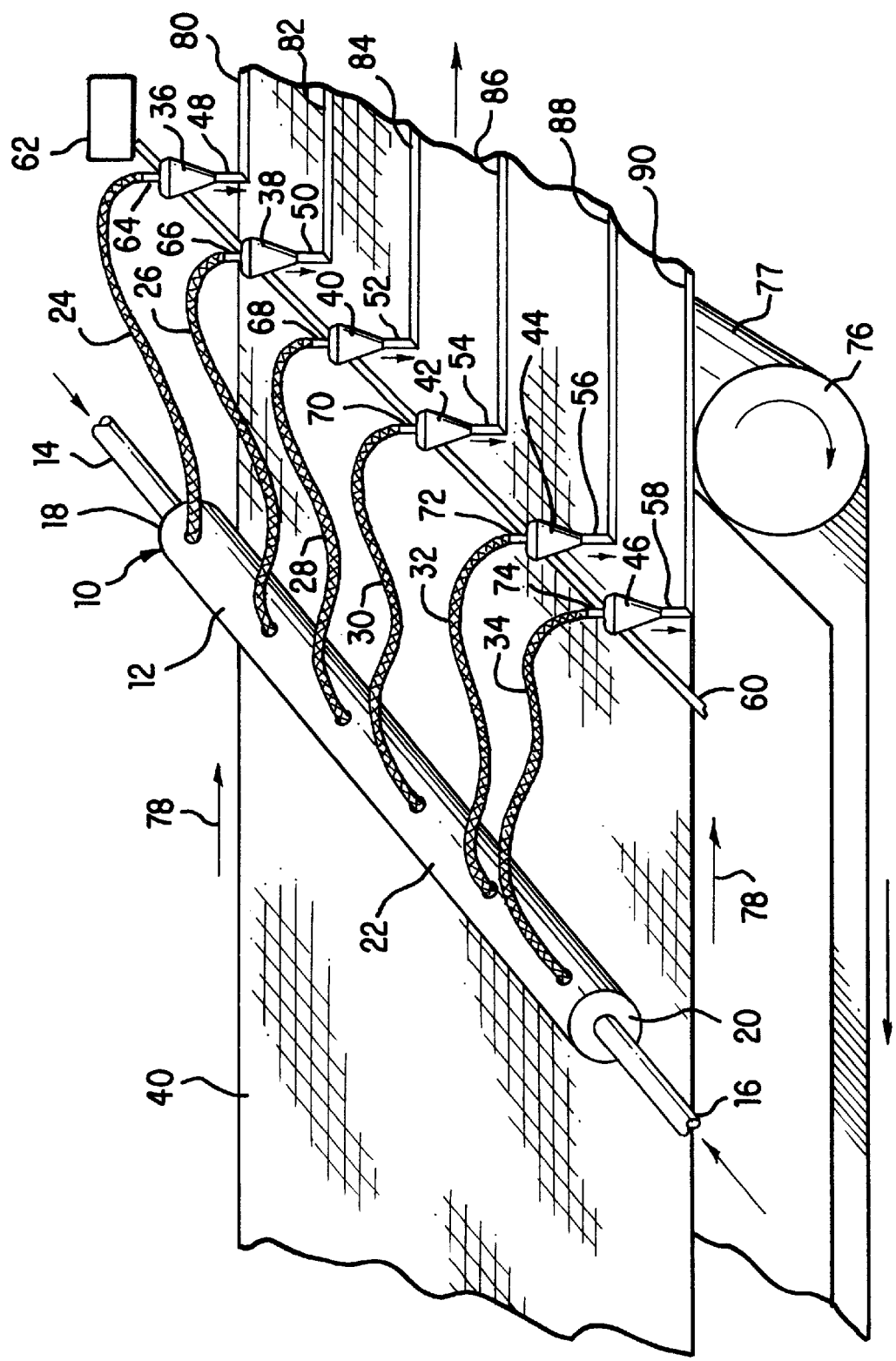
FIG. 2 is a perspective view of a process for bonding a spunbonded filament web, using the hot air knife assembly of the invention which supplies a plurality of spaced apart hot air knives.

Referring to FIG. 2, a hot air knife assembly 10 includes a header 12 which is supplied with hot air through the inlet channels 14 and 16. The header 12 is shaped like an elongated hollow cylinder having ends 18 and 20 and a main body 22. The hot air supply channels 14 and 16 feed air into the ends 18 and 20 of the header 12, as shown by the arrows.

The hot air supplied to the header 12 may have a temperature of about 200–550° F., more generally about 250–450° F., most commonly about 300–350° F. The optimum temperature will vary according to the polymer type, basis weight and line speed of the nonwoven web 40 traveling beneath the hot air knife assembly 10. For a polypropylene spunbond web having a basis weight of about 0.5–1.5 osy, and traveling at a line speed of about 1000–1500 feet per minute, a hot air temperature of about 300–350° F. is desirable. Generally, the hot air temperature should be at or near (e.g., slightly above) the melting temperature of the resin being bonded.

The preferred volumetric flow of hot air being fed to each hot air knife from the header 12 is generally dependent on the composition and weight of the web, the line speed, and the degree of bonding required. The air flow rate may be controlled by controlling the pressure inside the header 12. The air pressure inside the header 12 is preferably between about 1–12 inches of water (2–22 mm Hg), more preferably between about 4–10 inches of water (8–18 mm Hg). Of course, the volume of hot air required to effect the desired level of inter-fiber bonding may be reduced by increasing the temperature of the hot air. Operating parameters such as line speed, hot air volume, and hot air temperature can be determined and adjusted using techniques known and/or available to persons of ordinary skill in the art.

In the embodiment shown in FIG. 2, the header 12 is cylindrical, but it can be rectangular or of another shape. Numerous sizes and shapes can be employed for the header 12, with the preferred size depending largely on the width of the nonwoven web and the degree of bonding required. The header 12 can be constructed from aluminum, stainless steel, or another suitable material.

Extending from the header 12 are six spaced apart hot air conduits 24, 26, 28, 30, 32 and 34. The conduits may be rigid or flexible, but are preferably made of a flexible material in order to permit adjustment and/or movement. The conduits are each connected at one end to the header 12, and are connected at their other ends to six plenums 36, 38, 40, 42, 44 and 46. Each plenum engages a hot air knife slot, with the slots being labeled 48, 50, 52, 54, 56 and 58. The plenums and slots shown in FIG. 2 may each have a cross-section similar to that shown in FIG. 1, and described above with respect to the prior art. The difference is that prior art hot air knives comprised a single elongated plenum and slot extending across the web, whereas the hot air knife assembly 10 of the invention is divided into a plurality of spaced apart plenums and knife slots as shown in FIG. 2.

Hot air from the header 12 is preferably supplied at roughly equal volume and velocity to each of the conduits 24, 26, 28, 30, 32 and 34. This equal division of flow can be accomplished in simple fashion, by ensuring that the conduits are of equal dimensions and size and that the air pressure is uniform at the entrances to the conduits. On the other hand, if a particular application warranted feeding more or less air into some of the conduits than the others, different flow rates can be accomplished by individually valving the conduits, by designing them with different sizes, or by valving the plenums as explained below.

The plenums 36, 38, 40, 42, 44 and 46 are mounted to a slidable support bar 60. The plenums are mounted so that the lower tips of the air knife slots 48, 50, 52, 54, 56 and 58 are at a predetermined distance above the nonwoven web 40. The distance between the air knife slots and the nonwoven web should be about 0.25 to about 10 inches, preferably about 0.75 to about 3.0 inches, most preferably about 1.0 to about 2.0 inches. Preferably, the plenums are adjustably mounted to the support bar 60 so that the distance between the knife slots and the web can be varied according to the needs of the application.

A control panel 62 is provided on one side of the hot air knife assembly 10, incorporating individual flow controls for hot air entering the plenums. As shown, the plenums are provided with individual flow control valves 64, 66, 68, 70, 72 and 74 which can be used to individually adjust the air flow to each plenum. The flow control valves may be electronically linked to individual controls at the control panel 62 using conventional techniques available to persons skilled in the art. As explained above, it is often desirable to have roughly equal air flow to each of the plenums. The valves can be used for fine tuning and equalizing the air flows to the plenums, or for differentiating between them if different flows are desired.

The initially unbonded nonwoven web 40 is carried on an endless belt conveyor including a carrying screen 77 driven by rollers (one of them at 76) at a predetermined line speed. The nonwoven web 40 travels in the machine direction (indicated by arrow 78) underneath the hot air knife assembly 10, at a speed of generally about 100–3000 feet per minute, more commonly about 500–2500 feet per minute, desirably about 1000–2000 feet per minute. The hot air knife slots 48, 50, 52, 54, 56 and 58 apply jets of hot air into the nonwoven web, causing localized bonding between the nonwoven web filaments to occur, at spaced apart locations. The spaced apart bonding causes formation of "tread lines" representing the bonded areas 80, 82, 84, 86, 88 and 90. In the embodiment shown, the tread lines are linear. In another embodiment, the support bar 60 is in communication with an oscillator (not shown) which causes the support bar 60 to move back and forth in the transverse direction (i.e., perpendicular to the machine direction) as the nonwoven web 40 is carried forward in the machine direction. By using an oscillator, the tread lines 80, 82, 84, 86, 88 and 90 can be formed in a wavelike pattern including without limitation sine waves, triangular waves, square waves, trapezoidal waves, or irregular waves.

The thicknesses of the tread lines 80, 82, 84, 86, 88 and 90 correspond to the lengths of the air knife slots 48, 50, 52, 54, 56 and 58. Generally, the tread lines are as narrow as possible, to minimize the compaction and densification of the nonwoven web. The air knife slots may each have a length less than about 1.0 inch, preferably less than about 0.5 inch, more preferably about 0.10–0.25 inch. The length of the air knife slots will correspond substantially to the width of the bonded regions in the web 40. The lengths of the air knife slots (i.e., perpendicular to the movement of the web) may be determined based on the overall percentage of bond area desired. When the hot air knife assembly is used for pre-bonding a nonwoven web, the area of the web covered by the pre-bonding should be less than about 10% of the nonwoven web area, preferably about 1–5% of the nonwoven web area, more preferably about 2–3% of the nonwoven web area.

The width of the openings in the hot air knife slots 48, 50, 52, 54, 56 and 58 (i.e., the width of the opening as shown in FIG. 1) should be configured to give the desired velocity of air jets hitting the surface of the web 40. The actual velocity of the airjets is determnined by the air pressure inside the header 12, the total number of air knife slots, the lengths of the air knife slots, and the widths of the hot air knife slots. The desired air jet velocity from the air knife slots is whatever velocity is required to cause adequate bonding between the nonwoven web filaments. Generally, the width of each air knife slot opening (i.e., parallel to the direction of movement of the web) should be about 0.5 inch or less.

The number of spaced apart air knife plenums and slots may vary according to the width of the nonwoven web being treated, and the lengths of the individual air knife slots. The larger the number of plenums and slots is, the greater the maximum width of the web is that can be effectively treated. Generally, the hot air knife assembly 10 should include at least two spaced apart air knife plenums and slots, when the nonwoven web 40 has a width of about 14–16 inches. Nonwoven webs may have widths up to 140 inches or higher, and the desired number of air knife plenums may increase with the width of the nonwoven web. As explained above, the air knife assembly 10 shown in FIG. 2 includes six spaced apart air knife plenums and slots. The air knife plenums may be spaced from about 1–24 inches apart, but are preferably spaced from about 4–20 inches apart, more preferably from about 10–15 inches apart. Alternatively, the same effect may be created by providing a single slot opening extending across the width of the header 12, and blocking off parts of the slot opening to create individual slot openings between the blocked off regions.

The hot air knife assembly 10 of the invention makes it possible to produce nonwoven webs with less bonding between the filaments, and correspondingly less overall density than conventional nonwoven webs. The hot air knife assembly 10 is especially useful for the pre-bonding of initially unbonded spunbond webs as shown in FIG. 2. As explained above, the hot air knife assembly 10 may be used to produce pre-bonded spunbond webs in which the interfilament bond area constitutes less than about 10% of the total area, preferably less than about 5% of the total area, of the web. The spunbond nonwoven webs produced with these low bond areas typically have a very low density compared to conventional spunbond webs. The density of the nonwoven webs produced using the hot air knife assembly 10 is generally less than about 0.075 grams/cc, preferably, less than about 0.045 grams/cc, and may be as low as about 0.015 grams/cc. This density is measured under a 0.05 psi load. A three-inch diameter plastic disc is attached to a pressure gauge and placed on a sample of nonwoven web under a pressure of 0.05 psi. The thickness of the web is then measured, and the density is calculated by dividing the thickness by the affected area of the sample.

The zoned hot air knife assembly of the invention may be used to increase the integrity of a wide variety of spunbond nonwoven webs. The webs may, for instance, be constructed of a wide variety of polymers including without limitation polyamides, polyesters, copolymers of ethylene and propylene, copolymers of ethylene or propylene with a $C_4$–$C_{20}$ alpha-olefin, terpolymers of ethylene with propylene and a $C_4$–$C_{20}$ alpha-olefin, ethylene vinyl acetate copolymers, propylene vinyl acetate copolymers, styrene-poly(ethylene-alpha-olefin) elastomers, polyurethanes, A-B block copolymers where A is formed of poly(vinyl arene) moieties such as polystyrene and B is an elastomeric midblock such as a conjugated diene or lower alkene, polyethers, polyether esters, polyacrylates, ethylene alkyl acrylates, polyisobutylene, polybutadiene, isobutylene-isoprene copolymers, and combinations of any of the foregoing. The webs may also be constructed of bicomponent or biconstituent filaments or fibers, as defined above. The inter-filament bonding is effected as the nonwoven web 40 (FIG. 2) moves underneath the hot air knife slots 48, 50, 52, 54, 56 and 58, and is contacted with jets of hot air preferably within about 15 degrees of perpendicular to the web. As a consequence of the thermal energy imparted by the combination of temperature, pressure, and high flow rates of the air jets, the nonwoven web filaments are melted and bonded together at points of contact corresponding to the bonding or "tread" lines 80, 82, 84, 86, 88 and 90.

As explained above, the zoned hot air knife assembly is especially useful for producing low density, high integrity pre-bonded nonwoven webs which are then passed through a conventional inter-fiber bonding process. Through-air bonding (TAB) is one inter-fiber bonding process whose effectiveness is aided by initially passing the nonwoven web through the zoned hot air knife bonding process described above and illustrated in FIG. 2. Other forms of subsequent bonding or entangling may also be employed, including for example, thermal point bonding, hydroentangling, needle punching, stitch bonding, and the like.

It is desirable that the number and lengths of hot air knives (e.g., 48, 50, 52, 54, 56 and 58), as well as the process conditions, be selected to provide minimal increase in the overall density of the nonwoven web 40. Desirably, the nonwoven web 40 should have an average density after passing through the zoned hot air knife assembly that is within about 15% of its initial unbonded density, measured under a 0.05 psi load. Preferably, the average post-bonded density is within about 10% of the initial unbonded density, and is more preferably within about 7.5% of the initial unbonded density, measured under a 0.05 psi load.

The zoned hot air knife assembly and process of the invention are also useful for other purposes. Other uses include, without limitation, the bonding together of layers in spunbond/meltblown web laminates or spunbond/meltblown/spunbond web laminates, and the production of bonded carded webs. In addition to providing improved bonding over a lower percentage area, the zoned hot air knife can be adjusted to fuse and "film over" the nonwoven web or laminate along slit lines. This is accomplished by applying higher volume, higher velocity jets near the web edges. The filmed edges provide an inherent barrier which, for instance, can be used to help prevent body fluids from leaking out the sides of an absorbent structure including the web or laminate.

The zoned hot air knife also provides the flexibility of creating generally machine direction channels in a nonwoven web or laminate, having varying width and depth for optimizing body fluid management in absorbent structures, physical properties such as abrasion resistance in cover stock, and/or the aesthetic appearance in a wide variety of structures. In general, the zoned hot air knife also reduces energy requirements since only a small fraction of the nonwoven web or laminate is treated with heated air.

In the production of meltblown webs and laminates, the conventional hot air knife bonding process (covering 100% of the web) had a disadvantage in that it reduced desirable barrier properties. During the production of spunbond/meltblown/spunbond web laminates, for instance, compaction rolls were sometimes used to regain these barrier properties. The zoned hot air knife assembly of the invention can overcome this reduction in barrier properties if the high integrity bonding zones in the laminates are aligned with the slit lines (i.e., the locations where the laminates are cut to form end products), thereby eliminating the need for compaction.

EXAMPLES 1–4

Samples of a spunbonded polypropylene/polyethylene bicomponent web were made with a spinnerette using the following process conditions, to yield a web with the indicated properties:

| | |
|---|---|
| Polymer throughput: | 0.6 grams/hole/minute |
| Hole density: | 50 holes/inch |
| Line speed: | 60 feet per minute |
| Web basis weight: | 2.5 ounces per square yard |
| Fiber linear density: | 2.8 denier per filament |
| Fiber composition: | 50% polypropylene, 50% polyethylene in a side-by-side configuration |
| Web width: | 15 inches |

For Example 1, the web was not compacted or treated with a hot air knife. For Example 2, the web was compacted only using a standard compaction roller loaded at 64 pounds per linear inch, and was not treated with a hot air knife. For Example 3, the web was not compacted but was treated with a conventional hot air knife covering the full width of the web. The hot air knife was positioned one inch above the conveyor carrying the web, and had a slot width of 0.375 inches, an air speed of 2800 feet per minute, and an exit air temperature of 300° F.

For Example 4, a zoned hot air knife was used having three hot air knives spaced 3.5 inches apart, each having a slot length of 0.25 inch, and a slot width of 0.375 inch. Again, each hot air knife was positioned one inch above the conveyor and had an exit air speed of 2800 feet per minute, and an exit air temperature of 300° F.

Subsequently, each web sample was subjected to a through-air bonding process using an air speed of 100 feet per minute and an air temperature of 260° F.

The following table shows the thickness (mils) of each web (measured under zero load) at each stage of the process, and gives the breaking strength of each web prior to through-air bonding.

| Example # | 1 | 2 | 3 | 4 |
|---|---|---|---|---|
| HAK/Compaction Conditions | No HAK No compaction | No HAK Compaction | Full HAK No compaction | Zoned HAK No compaction |

-continued

| Example # | 1 | 2 | 3 | 4 |
| --- | --- | --- | --- | --- |
| Before HAK/Compaction Web Thickness (mil) | 800 | 800 | 800 | 800 |
| After HAK/Compaction Web Thickness (mil) | 800 | 220 | 300 | 750 |
| Unbonded Web Breaking Length (feet) | <2 (Unacceptable-numerous web defects) | 5 | 8 | 6 |
| After Bonding Web Thickness (mil) | 280 | 120 | 180 | 270 |

As shown above, the web of Example 1 (no hot air knife, no mechanical compaction) had unacceptably low web strength prior to the through-air bonding process, and showed a 65% decrease in thickness (under zero load) during the through-air bonding. The web of Example 2 (mechanical compaction only) had an acceptable web strength prior to through-air bonding but showed a dramatic 72.5% thickness reduction due to the compaction, and an overall 85% thickness reduction after through-air bonding.

The web of Example 3 (full hot air knife without mechanical compaction) had acceptable web strength prior to through-air bonding, but showed a large 62.5% decrease in thickness due to the hot air knife, and an overall 77.5% thickness reduction after through-air bonding. The web of Example 4 (zoned hot air knife, no compaction) was the only sample having acceptable web strength prior to through-air bonding with only a minimal (6.25%) average thickness reduction prior to through-air bonding, due to the hot air knife. This web showed an average thickness reduction of 66.25% after through-air bonding, which is almost as good as the 65% reduction experienced with the web of Example 1 having no pre-treatment.

While the embodiments disclosed herein are presently considered preferred, various modifications and improvements can be made without departing from the spirit and scope of the invention. The scope of the invention is indicated by the appended claims, and all changes that fall within the meaning and range of equivalency are intended to be embraced therein.

We claim:

1. A method of increasing the integrity of a nonwoven web or laminate including the web, comprising the steps of:

transporting the web or laminate including the web, at a speed between about 1000 and 3000 feet per minute, in a machine direction along a conveyor, the web or laminate having a first side facing the conveyor and a second side facing away from the conveyor; and applying heated air jets to the second side of the web or laminate including the web at a plurality of spaced apart locations, from a source spaced from the nonwoven web, the heated air jets being spaced apart in a direction transverse to the machine direction, the heated air jets causing localized bonding between filaments of the nonwoven web or laminate including the web along continuous bonding lines to increase the integrity of the nonwoven web or laminate including the web;

wherein the heated airjets are supplied across less than about 10% of a width of the nonwoven web or laminate transverse to the machine direction, and continuously during transportation of the nonwoven web or laminate in the machine direction to provide a nonwoven web or laminate including the web having a plurality of transversely spaced bonded regions that are substantially continuous and uninterrupted in the machine direction.

2. The method of claim 1, wherein at least three of the heated air jets are applied to the nonwoven web or laminate including the web at spaced apart locations.

3. The method of claim 1, wherein at least five of the heated air jets are applied to the nonwoven web or laminate including the web at spaced apart locations.

4. The method of claim 1, wherein at least six of the heated air jets are applied to the nonwoven web or laminate including the web at spaced apart locations.

5. The method of claim 1, wherein the heated air jets supply air at a temperature of about 200–550° F.

6. The method of claim 1, wherein the heated air jets supply air at a temperature of about 250–450° F.

7. The method of claim 1, wherein the heated air jets supply air at a temperature of about 300–350° F.

8. The method of claim 1, wherein the heated air jets are supplied across less than about 5% of the width of the nonwoven web or laminate.

9. The method of claim 1, wherein the heated air jets are supplied across less than about 3% of the width of the nonwoven web or laminate.

10. The method of claim 1, wherein the heated air jets are applied to the nonwoven web or laminate in straight lines as the web or laminate passes beneath the jets.

11. The method of claim 1, wherein the heated airjets are applied to the nonwoven web or laminate in a wave pattern as the web or laminate passes beneath the jets.

12. A method of thermally bonding a nonwoven web, the method comprising the steps of:

transporting an unbonded nonwoven web having an initial density measured under a load of 0.05 psi in a direction of travel at a speed between about 1000 and 3000 feet per minute beneath a plurality of heated air jets supplied from air knife slots spaced from the nonwoven web and spaced apart from each other in a direction transverse to the direction of travel;

the heated air jets being supplied across less than about 10% of a widt of the nonwoven web and continuously along a length of the nonwoven web; and forming bonded regions in the nonwoven web using hot air supplied in the heated air jets to form a thermally bonded nonwoven web having an average density measured under a load of 0.05 psi, the average density being within 15% of the initial density;

wherein the bonded regions are less than about 1.0 inch wide and about 1–24 inches apart from each other across the width of the nonwoven web and are substantially continuous and uninterrupted along the length of the nonwoven web.

13. The method of claim 12, wherein the bonded regions are spaced apart by about 4–20 inches.

14. The method of claim 12, wherein the bonded regions are spaced apart by about 10–15 inches.

15. The method of claim 12, wherein the bonded regions each have a width less than about 0.5 inch.

16. The method of claim 12, wherein the bonded regions each have a width of about 0.10–0.25 inch.

17. The method of claim 12, wherein the average density of the thermally bonded nonwoven web is within about 10% of the initial density of the unbonded nonwoven web, measured under a load of 0.05 psi.

18. The method of claim 12, wherein the average density of the thermally bonded nonwoven web is within about 7.5% of the initial density of the unbonded nonwoven web, measured under a load of 0.05 psi.

19. The method of claim 12, wherein the average density of the thermally bonded nonwoven web is less than about 0.075 grams/cc, measured under a load of 0.05 psi.

20. The method of claim 12, wherein the average density of the thermally bonded nonwoven web is less than about 0.045 grams/cc, measured under a load of 0.05 psi.

21. A method of bonding a nonwoven web or laminate including the web, comprising the steps of:

transporting the web or laminate including the web in a machine direction at a speed between about 1000 and 3000 feet per minute along a conveyor and beneath a hot air knife assembly, with a first side of the web or laminate contacting the conveyor and a second side of the web or laminate spaced from and facing the hot air knife assembly;

the hot air knife assembly applying heated airjets to the nonwoven web or laminate including the web at a plurality of spaced apart locations covering less than about 10% of a width of the web or laminate including the web transverse to the machine direction, and continuously during transportation of the web or laminate including the web in the machine direction, to cause thermal bonding of some filaments in the web; and subjecting the web or laminate including the web to a second bonding process.

22. The method of claim 21, wherein the second bonding process comprises through-air bonding of the nonwoven web.

23. The method of claim 21, wherein the second bonding process comprises thermal point bonding of the nonwoven web.

24. The method of claim 21, wherein the second bonding process comprises hydroentangling of the nonwoven web.

25. The method of claim 21, wherein the second bonding process comprises needle punching of the nonwoven web.

26. The method of claim 21, wherein the second bonding process comprises stitch bonding of the nonwoven web.

* * * * *